Figure 1:
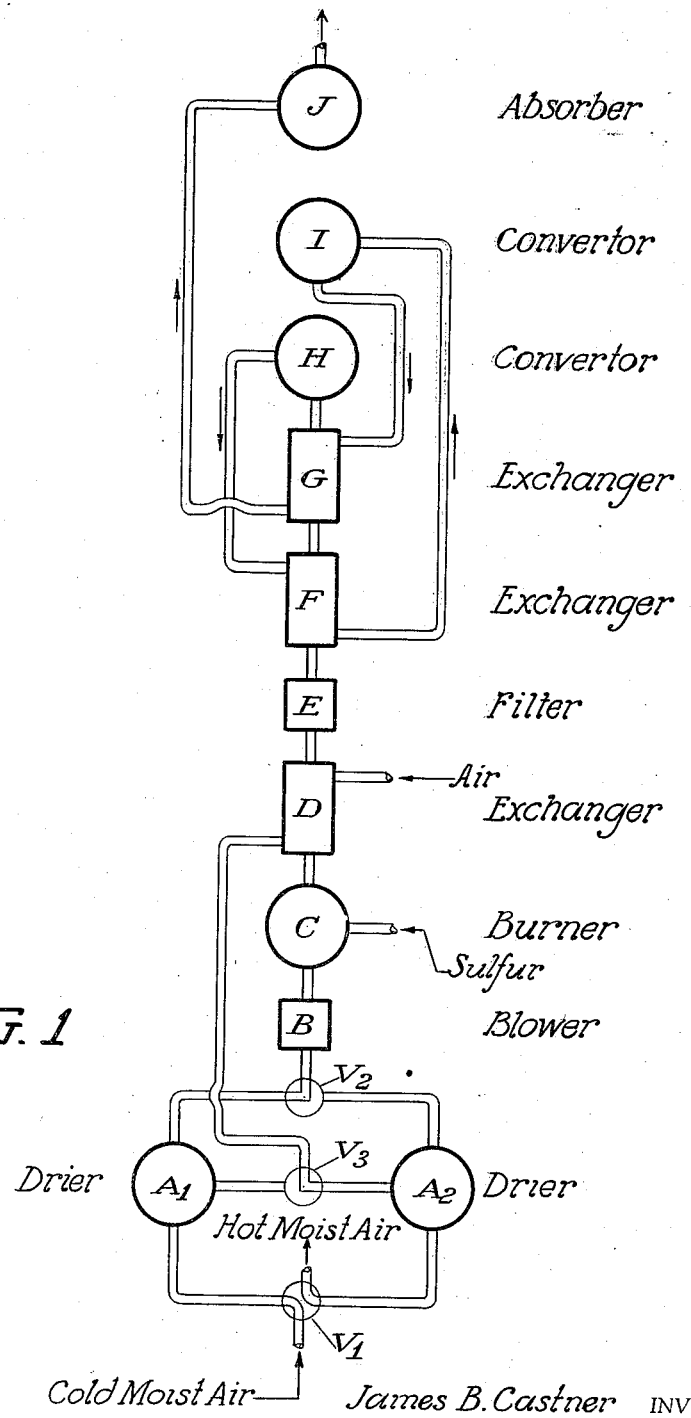

June 20, 1939.   J. B. CASTNER   2,163,371
PROCESS OF PRODUCING SULPHURIC ACID
Filed Jan. 4, 1936   3 Sheets-Sheet 2

James B. Castner INVENTOR.

Patented June 20, 1939

2,163,371

UNITED STATES PATENT OFFICE 2,163,371

PROCESS OF PRODUCING SULPHURIC ACID

James B. Castner, Woodbury, N. J., assignor to E. I. du Pont de Nemours & Company, Wilmington, Del., a corporation of Delaware Application January 4, 1936, Serial No. 57,492

2 Claims. (Cl. 23—175)

The present invention relates to the manufacture of sulphuric anhydride, and more particularly to a new and improved method of manufacturing sulphuric acid by the contact process.

In the manufacture of sulphuric acid by the contact process, sulphur dioxide is produced at relatively elevated temperatures by roasting pyrites or more generally by burning sulphur in a current of air. The hot sulphurous gases thus produced are then cooled by various means to conversion temperature, or below, usually by heat interchange with a fluid heat exchange medium such as water. After suitable purification, the sulphur dioxide, reheated to conversion temperature if necessary, is passed over a contact mass comprising platinum, vanadium oxide or the like, which converts the $SO_2$ to $SO_3$. Due to the strongly exothermic nature of this reaction, the conversion process is commonly carried out in two steps, the partially converted gases from the first contact mass being cooled to the proper temperature before coming in contact with a second catalytic mass. After substantially complete conversion, the sulphuric anhydride is cooled to satisfactory absorption temperature and then passed to the absorption system.

It has long been recognized that the presence of moisture in the air supplied to the sulphur burners results in the formation of a corrosive mist which "poisons" the contact mass. This deleterious effect on the catalyst is customarily avoided by two general methods: (1) by passing the burner gases through an elaborate purification system; and (2) by pre-drying the air. The former alternative was utilized in the old Grillo Oleum Plant (see for example Lunge, "The Manufacture of Acids and Alkalis", volume 4, page 295). The second method, which is by far the more satisfactory, was employed as early as 1901 by Hasenbach (U. S. 681,698), while both methods were used in the old Mannheim process (see for example "Technical Records of Explosive Supply" published by the Ministry of Munitions, Great Britain, 1921, volume of 1915–1918, page 3).

The drying systems heretofore employed were based essentially on that utilized in the Mannheim process. According to this method, the air was forced through two sulphuric acid drying towers connected in series, the acid in the second tower being of higher concentration than that in the first tower. When the acid in the pre-dryer became undesirably diluted, it was reconcentrated by suitable means, usually by the absorption of sulphuric anhydride therein. Although this old pre-drying system has been widely used heretofore, it possesses a number of disadvantages. In the first place it involves large pre-drying towers of corrosion-resistant material; and in the second place it necessitates the frequent handling of large volumes of corrosive liquid. For these and other reasons a more satisfactory pre-drying system for the air required for the sulphur burners is desirable.

The relatively enormous quantities of waste heat liberated in the process have been utilized heretofore for various purposes, for example, to generate steam (Zeisberg U. S. 1,545,381), to superheat steam (Bezanson U. S. 1,542,488), or to reheat the cooled burner gases before introduction to the contact mass. (See for example Lunge, loc. cit., page 173). As far as known, however, no method has been proposed heretofore whereby waste heat of the process may be used to regenerate the drying system required to remove the moisture from the air supplied to the sulphur burners.

The object of the present invention is a new and improved method of manufacturing sulphur dioxide for the production of sulphuric anhydride by the contact process. A further object is a more rational method of utilizing the waste heat liberated in the production of sulphuric anhydride by the contact process. A still further object is an improved process of pre-drying the air required for the sulphur burners of a sulphuric acid plant.

I have found that these objects may be accomplished by utilizing in the pre-drying system a solid dehydrating agent capable of thermal reactivation or regeneration without substantial impairment of its dehydrative power or capacity. A great number of solid drying agents capable of regeneration by means of heated air may be employed according to my invention if desired, but the agent selected should be one which does not liquefy or undergo any substantial change in physical state whereby its dehydrative power is impaired, or its regeneration is rendered difficult or inefficient. As examples of this type of drying agent, I may mention the following: magnesium chloride, calcium chloride or lime, either by itself, or mixed with plaster of Paris, cement, or other supporting media; anhydrous sulphates such as anhydrous magnesium or aluminum sulphate; $P_2O_5$ mixed with charcoal, plaster of Paris, or the like; barium and/or magnesium perchlorate; kieselguhr, diatomaceous earth, pumice, volcanic ash, and the like mixed with charcoal and alkali; acidified clays; calcined gypsum and similar materials. I prefer, however, to employ a water insoluble drying agent capable of thermal regeneration without substantial impairment of its dehydrative power or capacity. As an example of such a drying agent, I may cite activated alumina and a form of silica commonly known as silica gel, as the preferred drying agents for my improved process.

According to my invention, the air required in the manufacture of sulphuric acid from sulphur dioxide produced either by the roasting of pyrites or by the burning of sulphur, is passed through a contact dryer containing a solid dehydrating agent capable of thermal reactivation. When the efficiency of the dryer falls below the desired level, the dryer is disconnected, and air, heated by heat exchange with the hot burner gases or the hot converter gases or both, is passed through the contact dryer in order to reactivate the same.

In order to describe my invention more clearly, I shall refer to the accompanying diagrams which represent several embodiments thereof. It is to be understood, however, that this is done solely by way of illustration and is not to be regarded as a limitation upon the scope of my invention, which has many important embodiments other than those hereinafter more fully described.

Figure 2:
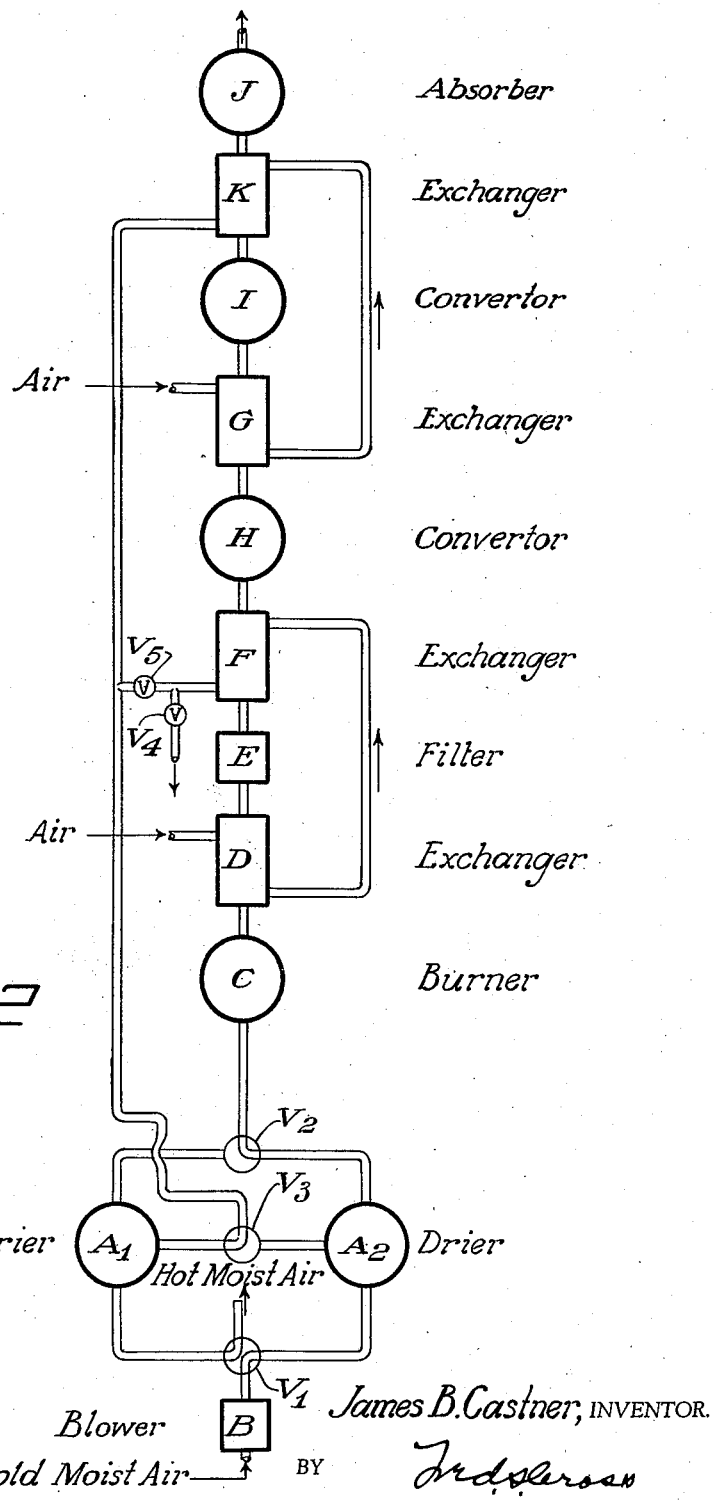
Figure 3:
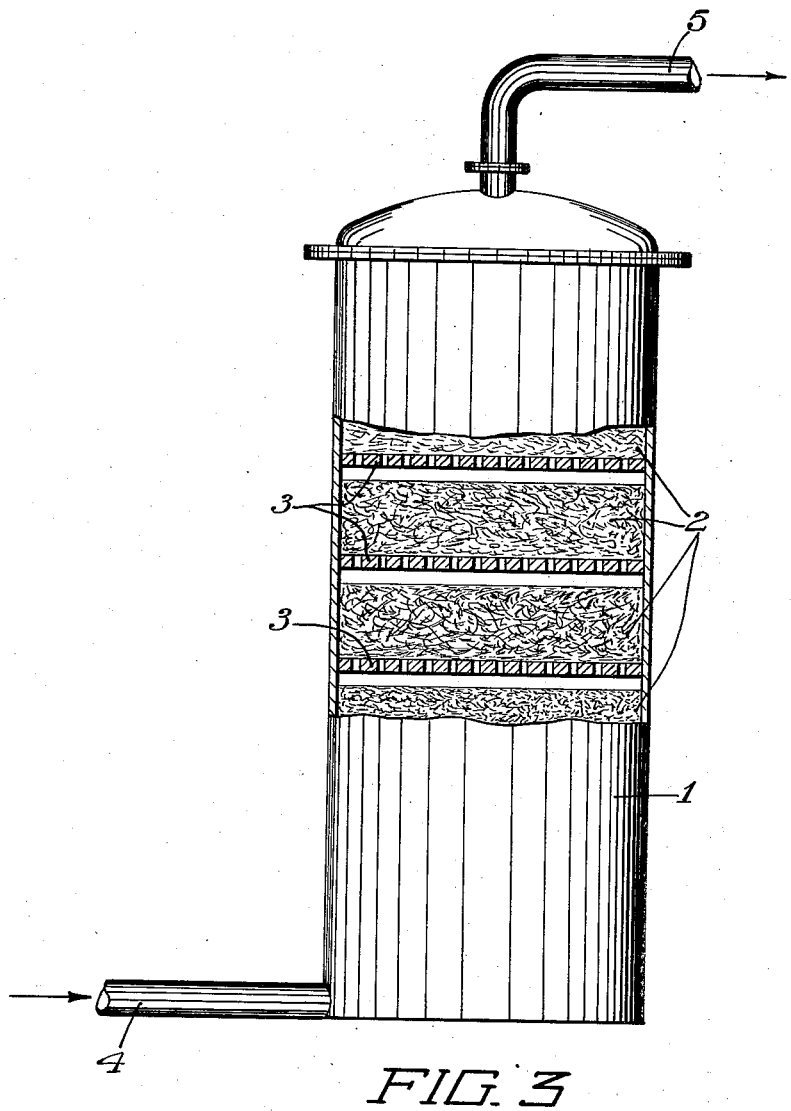

Referring generally to the diagrams, Figures 1 and 2 represent flow sheets of two methods of manufacturing sulphuric acid in accordance with my invention. Figure 3 shows a sectional elevation of a suitable contact dryer which may be employed in the process indicated in the flow sheets. Similar characters are used in the drawings and throughout the accompanying description to designate corresponding parts.

Referring generally to the flow sheets of Figures 1 and 2, the diagrams illustrate two contact dryers $A_1$ and $A_2$ connected in parallel between the sulphur burner C and a common source of moist atmospheric air. Suitable valves $V_1$ and $V_2$ are provided whereby the moist air may be passed through either tower as desired, and forced into the sulfur burner C.

Simultaneously, molten sulphur is introduced into the burner C. The hot sulphurous gases thus produced are cooled, for example to 700° F., or lower if desired, for example, to 300° F., by means of the heat exchanger D. The cooled gases are then passed through the filter E into the heat exchanger F, where the temperature of the sulphurous gases is raised to about 700–750° F. before the gases enter the first converter H. After partial conversion in the converter H, the gases are cooled in the exchanger F (Figure 1) or G (Figure 2) to the proper temperature before entering the second converter I. The substantially completely oxidized gases are then cooled to absorption temperature in the exchangers G (Figure 1) or K (Figure 2) before entering the absorption system J.

In Figure 1, the air is drawn by the blower B into the contact dryers which contain activated alumina. The dryers are periodically regenerated or reactivated by means of the waste heat of the burner gases. The air passing through the exchanger D is forced through the tower $A_2$, for example, while the other tower $A_1$, is being employed to dry the air required for the sulphur burner C. When the efficiency of the first tower $A_1$ falls below a desirable limit, the valves $V_1$, $V_2$ and $V_3$ are readjusted so that the cold moist air passes through $A_2$, while the hot air from the exchanger D passes through $A_1$.

In Figure 2, the moist air is forced by the blower B into the contact dryers which contain activated silica. The dryers are periodically reactivated by means of the waste heat of the converter gases. The air passing through the exchangers G and K is forced through one of the towers, $A_1$ for example, while the other tower, $A_2$, is being employed to dry the moist air from the atmosphere. A similar arrangement of valves $V_1$, $V_2$ and $V_3$ affords a means of switching from one drying tower to the other as in Figure 1. If desired, the air passing through the exchangers D and F may also be employed to regenerate the dryers, by the proper adjustment of the valves $V_4$ and $V_5$. In this manner the waste heat of the burner gases, as well as that from the converter gases, may be employed to reactivate the dryers.

Referring now to Figure 3, the construction of one of the drying towers, $A_1$ for example, is shown. The dryer comprises a cylindrical tower 1 of suitable material, metal for example, containing the solid drying agent 2, such as activated alumina or activated silica, which is supported on a plurality of perforated plates 3. The tower is provided with a gas inlet 4 and a gas outlet 5. Moist air is drawn or forced in through the inlet 4 and as its passes over the contact material 2, the moisture contained in the air is absorbed by the drying agent 2. During the regeneration phase, hot air from the heat exchanges enters the dryer, for example through the inlet 4, and drives the moisture out of the contact material 2, the hot moist air being discharged into the atmosphere.

In operation, the drying towers are used alternately. Thus, one of the contact dryers, $A_2$ for example, is disconnected from the blower B as in Figure 1, the moist air being by-passed through the tower $A_1$. The moist air is dried in the tower $A_1$ and forced into the sulphur burner C. The hot $SO_2$ is then cooled, filtered, heated to conversion temperature and then converted to $SO_3$.

While the contact dryer $A_1$ is being used to pre-dry the air required for the sulphur burner, the waste heat generated in the conversion of S to $H_2SO_4$ is employed according to any of the methods indicated in reactivating the dryer $A_2$. The hot air from the heat exchangers is passed through the tower $A_2$ until the drying agent is substantially completely reactivated. The hot air is then by-passed to the atmosphere or utilized for any desired purpose.

When the efficiency of the dryer $A_1$ has fallen below the desired level, the valves $V_1$, $V_2$ and $V_3$ are changed and the other tower $A_2$ is employed to dry the air while $A_1$ is being reactivated.

The advantages of my invention are numerous and important. It affords a method for the utilization of substantially all the waste heat of the process. It provides a simple, easily regenerated, efficient means of pre-drying the air required for the sulphur burners, thereby obviating the extensive equipment formerly required for this purpose. Other advantages will be apparent to anyone skilled in the art.

In the foregoing detailed description of my invention, it is apparent that many variations in detail may be made without departing from the spirit and scope thereof. Thus, for example, the sulphur dioxide may be produced, if desired, by the roasting of pyrites, or from other sulphur-containing materials such as industrial wastes, for example iron sulphate, according to methods well known in the art. Again the dry sulphur dioxide produced in accordance with my invention may be utilized for other purposes than the production of sulphuric anhydride. Thus it may be liquified and used as anhydrous liquid $SO_2$. Furthermore, some of the waste heat liberated in the process may be utilized for the generation of steam, or for other useful purposes such as preheating the air employed in the process. Other variations will be apparent to anyone skilled in the art. I, therefore, intend to be limited only in accordance with the following patent claims:

I claim:

1. The process of manufacturing sulphuric acid which comprises burning sulphur with pre-dried air to produce sulphur dioxide, cooling said sulphur dioxide to below conversion temperature by heat interchange with a fluid heat exchange medium, filtering said cooled sulphur dioxide, reheating the same to conversion temperature by means of the heat liberated in the oxidation of $SO_2$ to $SO_3$, and catalytically converting said sulphur dioxide to sulphuric anhydride, said pre-dried air being dried by means of a drying agent comprising at least one member of the group consisting of activated alumina and silica gel, said drying agent being periodically substantially completely regenerated solely by means of hot air heated by exchange with said sulphur dioxide.

2. The process of manufacturing sulphuric acid which comprises burning sulphur with pre-dried air to produce sulphur dioxide, cooling said sulphur dioxide to below conversion temperature by heat interchange with a fluid heat exchange medium, filtering said cooled sulphur dioxide, reheating the same to conversion temperature by means of the heat liberated in the burning of sulphur to sulphur dioxide, and catalytically converting said sulphur dioxide to sulphuric anhydride, said pre-dried air being dried by means of a drying agent comprising at least one member of the group consisting of activated alumina and silica gel, said drying agent being periodically substantially completely regenerated solely by means of hot air heated by exchange with said sulphuric anhydride.

JAMES B. CASTNER.